(No Model.)
J. ARNAO, Jr.
DRIVING BELT.
No. 375,308. Patented Dec. 20, 1887.
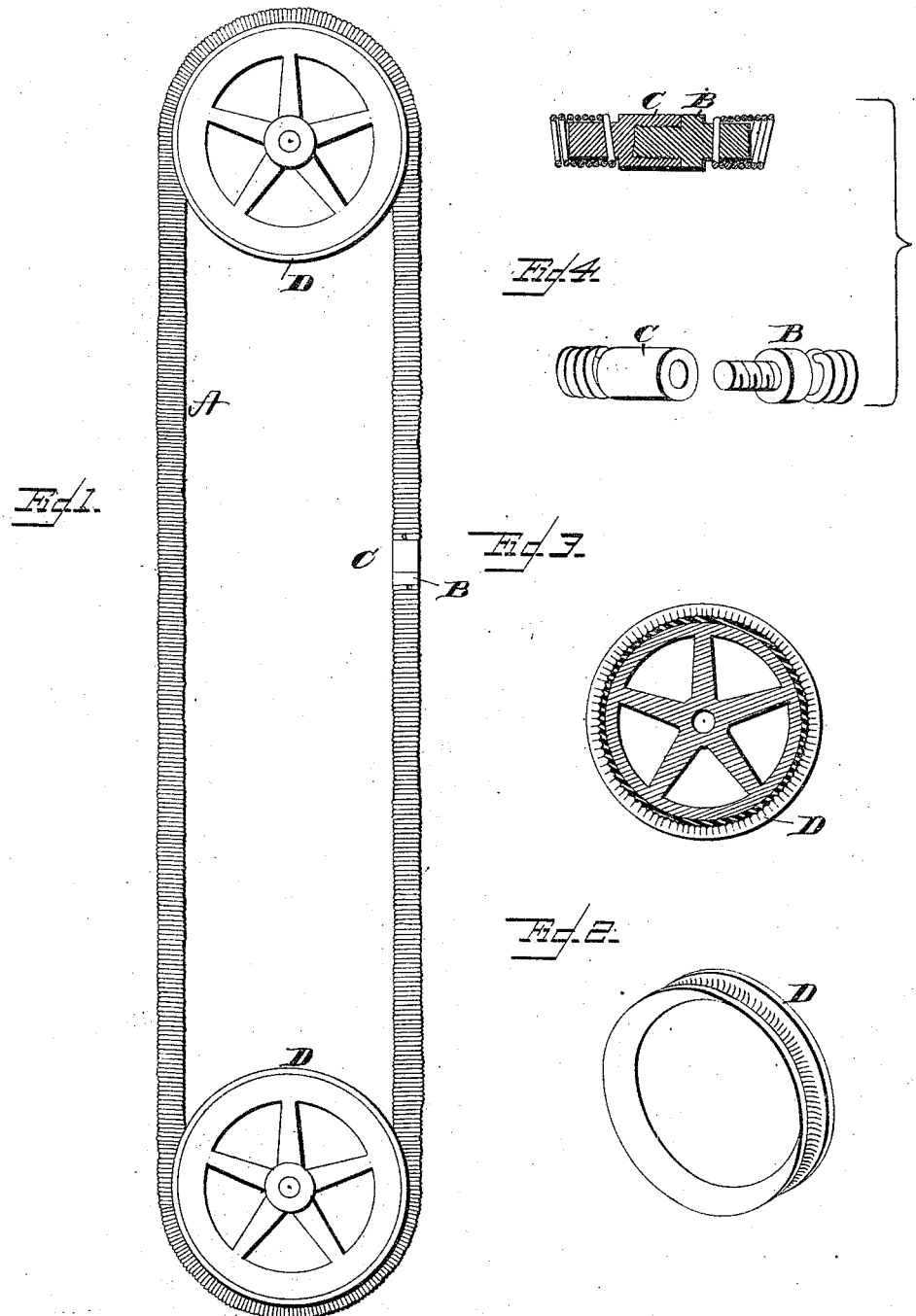
WITNESSES
F. L. Ourand
H. L. Chamblin
INVENTOR
Juan Arnao Jr.
C. H. Watson & Co.
Attorney

UNITED STATES PATENT OFFICE.

JUAN ARNAO, JR., OF TROY, NEW YORK.

DRIVING-BELT.

SPECIFICATION forming part of Letters Patent No. 375,308, dated December 20, 1887.

Application filed August 13, 1887. Serial No. 246,903. (No model.)

*To all whom it may concern:*

Be it known that I, JUAN ARNAO, Jr., a citizen of the United States, residing at Troy, in the county of Rensselaer and State of New York, have invented certain new and useful Improvements in Belts for Machinery; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to an improvement in belting; and its object is to provide a device in the combination of metallic belts and pulleys which will prevent abrasion of the belt, avoid the noise and friction usually occasioned by said combination, and prevent the soiling of delicate or fancy articles manufactured by machinery. I attain this end by the means explained in the following specification, and fully illustrated in the accompanying drawings, in which—

Figure 1 is a perspective view of belt and fastener. Fig. 2 is a detached view of the leather which is placed in the grooves upon rim of pulleys. Fig. 3 is a sectional view of pulleys with the leather in the grooves of same, and Fig. 4 is a view of fastener.

A designates the belt, which is made of spirally-coiled metallic wire—such as will maintain its elasticity under usual pressure required and impart power to the machinery. This belt is constructed with great care for the purpose of utilizing the highest degree of power expended in running machinery and maintaining a uniform tension.

The ends of belt A are secured by means of a coupling, B C, which consists of the part B, with threads cut thereon to be adapted to the grooves in the part C. The parts B and C are secured to the ends of belt A by means of the wire of belt A passing diametrically through the ends of B and C and coiled over or riveted thereto. The ends of belt A are also secured by means of threads being cut upon each end of part B, and so formed as to be adjusted or screwed into the spirally-coiled wire of the ends of belt A.

To secure the ends or coupling of belt A it is necessary to turn the part B sufficiently and place it at entrance of the cavity of wire or part C. Upon releasing the hold the wire of belt will assume its normal position. This will firmly secure the ends.

D represents the leather, which is used as a lining for the groove of pulley or pulleys. This leather is made with corrugations corresponding to the spirally-coiled wire of belt A. It may, however, be made smooth and without corrugations.

The advantages accruing from my invention are:

First. It prevents the abrasion of belts. This removes one of the greatest objections to the use of metallic belts with iron pulleys, as the abrasion renders the belt useless in a short time, and it is expensive to replace.

Second. It avoids the harsh grating sound occasioned by metallic belts working upon iron pulleys.

Third. It prevents the oil accumulating on belt, whereby many fancy and delicate articles manufactured by machinery are soiled and rendered useless. The leather D provides a soft bedding for the belt, as well as absorbs the oil that usually accumulates thereon.

I am aware that the idea of spirally-coiled metallic belts working upon iron pulleys is not new; hence I do not claim this idea, broadly; but what I do claim, and desire to secure by Letters Patent, is a device that will overcome all of the objections that have been urged against the use of metallic belts with iron pulleys.

I claim—

An improvement in belting, consisting of belt A, provided with coupling B C, in combination with a grooved pulley or pulleys, with the leather D, corrugated or smooth, placed as a lining in the groove of pulley or pulleys, substantially as described, and for the purpose set forth.

In testimony whereof I affix my signature in presence of two witnesses.

JUAN ARNAO, JR.

Witnesses:
 JOHN E. HOAG,
 RAMON ARNAO.